United States Patent [19]

Hayes

[11] Patent Number: 5,345,797
[45] Date of Patent: Sep. 13, 1994

[54] MOTOR VEHICLE ANTI-THEFT DEVICE

[75] Inventor: John Hayes, Blackrock, Ireland

[73] Assignee: Robert J. McGrath, Killiney, Ireland

[21] Appl. No.: 71,248

[22] Filed: Jun. 2, 1993

[51] Int. Cl.⁵ ............................................. B60R 25/02
[52] U.S. Cl. ........................................ 70/218; 70/223; 70/371; 292/DIG. 27
[58] Field of Search ............... 70/149, 221–223, 70/472, 188, 189, 204, 218, 371; 292/DIG. 27

[56] References Cited

U.S. PATENT DOCUMENTS

| | | | |
|---|---|---|---|
| 1,252,567 | 1/1918 | Hancock et al. | 70/223 X |
| 1,444,977 | 2/1923 | Manlet | 70/221 |
| 1,592,630 | 7/1926 | Ganz | 70/221 |
| 1,598,623 | 9/1926 | Smyser | 70/223 |
| 1,608,593 | 11/1926 | Gillett | 70/223 X |

FOREIGN PATENT DOCUMENTS

| | | | |
|---|---|---|---|
| 480999 | 8/1929 | Fed. Rep. of Germany | 70/221 |
| 652939 | 11/1937 | Fed. Rep. of Germany | 70/223 |
| 728914 | 12/1942 | Fed. Rep. of Germany | 70/221 |
| 483480 | 7/1917 | France | 70/223 |

Primary Examiner—Lloyd A. Gall
Attorney, Agent, or Firm—Lahive & Cockfield

[57] ABSTRACT

An anti-theft device for a motor vehicle comprises a steering wheel 10 having a centre boss 12 mounting the steering wheel onto a steering column 11. The boss is slidable axially of the steering column between a first position in which complementary splines 14/15 on the steering column and boss engage each other to secure the steering wheel and steering column for co-rotation and a second position in which the splines are disengaged so that the steering wheel is freely rotatable on the steering column. A lock 21 can secure the steering wheel in a selected one of the first and second axial positions by engaging in a groove 17 or 18 in the steering column.

2 Claims, 1 Drawing Sheet

MOTOR VEHICLE ANTI-THEFT DEVICE

BACKGROUND OF THE INVENTION

This invention relates to an anti-theft device for use with a motor vehicle, and in particular to an anti-theft device which in use immobilises the vehicle by preventing a thief from steering the motor vehicle in a proper manner.

SUMMARY OF THE INVENTION

According to the present invention there is provided an anti-theft device for a motor vehicle, comprising a steering wheel having a boss by which the steering wheel is mounted onto a steering column of the vehicle, the boss being slidable axially of the column between a first position in which the steering wheel and steering column are secured for co-rotation and a second position in which the steering wheel is freely rotatable on the steering column, and a lock for securing the steering wheel in a selected one of the first and second axial positions.

BRIEF DESCRIPTION OF THE DRAWINGS

The invention will be understood from the following description of an embodiment thereof given by way of example only with reference to the accompanying drawings, in which.

DETAILED DESCRIPTION OF THE INVENTION

Figure 1:
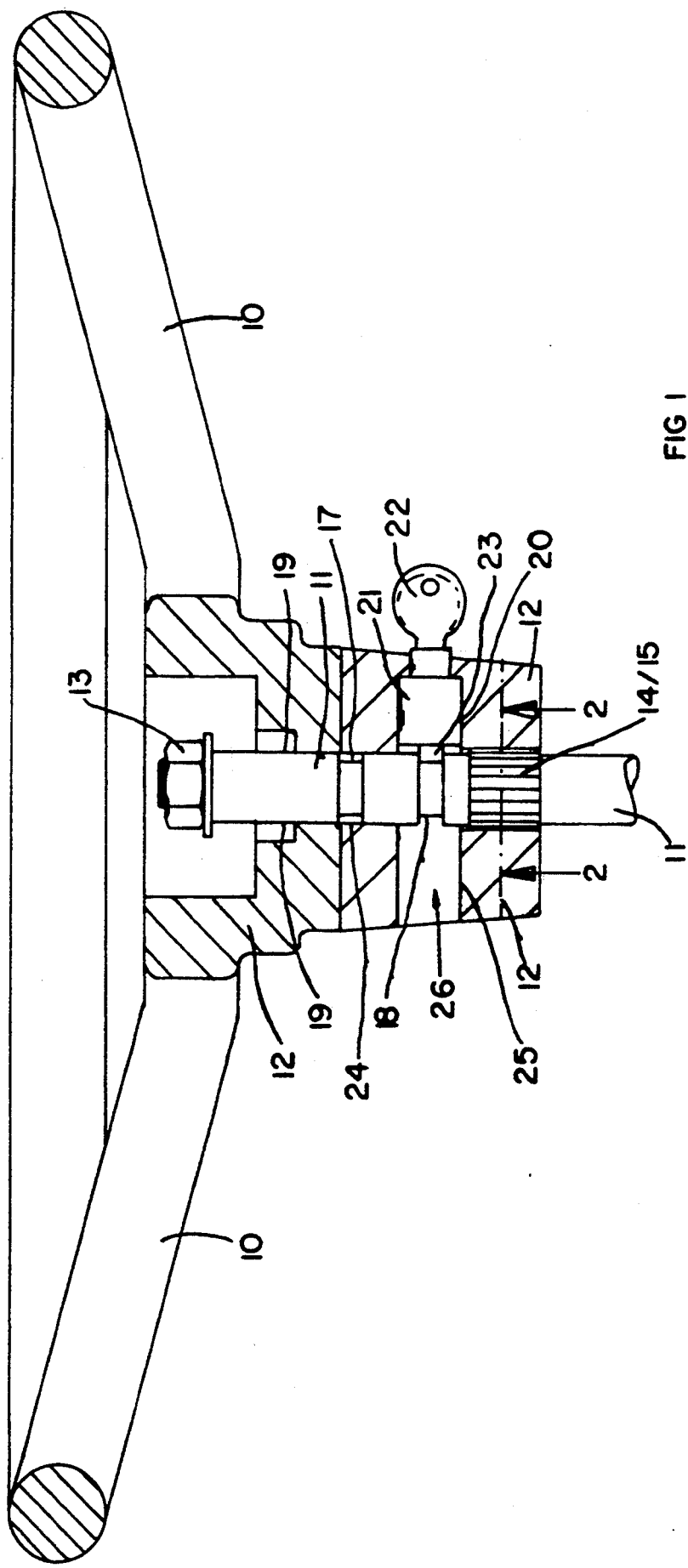
FIG. 1 is a vertical cross-section of the motor vehicle anti-theft device of the present embodiment.

The motor vehicle anti-theft device shown in the figures is fitted as part of the steering mechanism of a motor car and is adapted to prevent steering of the car when the device is in its operative position. FIG. 1 shows a generally conventional steering wheel 10 having an aluminium centre boss 12 by means of which the steering wheel is mounted on a steel steering column 11. In particular, the boss has a center bore 24 which fits closely on, and permits the boss to slide axially of, the steering column 11. The boss is retained on the steering column by a metal locking nut 13, the boss having a recess 19 to accommodate the nut 13 when the boss 12 is in its uppermost position on the steering column.

Figure 2:
FIG. 2 is a transverse cross-section along the line 2—2 of FIG. 1.

A lower portion of the bore 24 is provided with splines 14 which engage in a predetermined angular position with a complementary set of splines 15 on the steering column 11. The exact angle at which these splines 14/15 engage is determined by the provision of an odd sized spline 16 on the steering column 11 as illustrated in FIG. 2. The odd size spline 16 engages only with a complementary shaped spline recess on the boss 12 to ensure that when the splines 14/15 are engaged the steering wheel 10 has a predetermined position on the steering column 11.

The steering column 11 is provided with two circumferential grooves, a neutral groove 17 and an in-use groove 18. The boss 12 is provided with a lock recess 20 which opens onto the steering column 11 and accommodates a lock 21 operated by a key 22. The lock 21 has a lock tongue 23 which, according to the axial position of the boss 12 on the steering column 11, can engage either the neutral groove 17 or the in-use groove 18 on the steering column 11. When the lock tongue 23 engages the in-use groove 18 the splines 14/15 are engaged, which is the position shown in FIG. 1, whereas when the lock tongue 23 engages the neutral groove 17 the splines 14/15 are not engaged.

The position of the lock 21 in the lock recess 20 is important. The recess 20 actually comprises one end of a bore 25 in the boss 12 which extends transversely with respect to the axis of the steering column 11 and has an entrance 26 on the far side of the steering column to the recess 20. The lock 21 is insertable and removable from the bore 25 only through the entrance 26 and, since the steering column 11 blocks the cross-section of the bore 25 between the entrance 26 and the recess 20, the lock is trapped in the recess 20 when the boss 12 is on the steering column 11. Thus the lock 21 is insertable and removable from the recess 20 only when the boss 12 is removed from the steering column 11.

It will also be appreciated that the lock construction is such that the key 22 may only be removed from the lock 21 when the lock tongue 23 is engaged in either the neutral groove 17 or the in-use groove 18.

To describe the operation of the device, it is assumed that the boss 12 is initially in the axial position on the steering column 11 shown in FIG. 1, with the splines 14/15 in engagement and the lock tongue 23 engaging in the in-use groove 18. In this position the steering column 11 and steering wheel 10 are secured for co-rotation by the engaging splines 14/15 and the steering wheel may be used to steer the vehicle as normal.

If one now wishes to use the anti-theft device, one turns the key 22 in the lock 21 to withdraw the lock tongue 23 from its position in the in-use groove 18. When the lock tongue 23 is withdrawn from the groove 18 the boss 12 may then be lifted (slid) on the steering column 11 to disengage the cooperating splines 14/15. In lifting the boss 12 on the steering column 11 one lifts until the nut 13 is housed in the recess 19 and when this position has been achieved the key 22 is turned in the lock 21 to engage the lock tongue 23 in the neutral groove 17. The steering wheel 10 is now locked in a neutral position on the steering column 11 and may be rotated freely on the steering column 11 because the lock tongue 23 simply rotates around the steering column in the groove 17. Thus in this position it is not possible to steer the vehicle using the steering wheel since the boss 12 and the steering column 11 are not operatively engaged for steering the motor vehicle.

It will be understood that for safety reasons the car electronics are appropriately and conventionally adapted such that it is not possible to start the car engine using an ignition key in the usual manner unless the anti-theft device is not operative and the lock tongue 23 is engaged in the in-use groove 18.

Further a visual and/or audible warning device electronically operated is provided to warn a user of the motor vehicle should the user seek to start the engine when the anti-theft device is in use with the lock tongue 23 engaged in the neutral groove 17.

In the embodiment described above the splines on the boss 12 are located at the lower end of the boss. It will be understood that the splines may be located at any position intermediate the ends of the boss to engage with splines suitably positioned on the steering column 11. The neutral and in-use grooves may also be located as appropriate to allow the device to function, the minimum spacing on the steering column between the neutral and the in-use grooves being determined by the length of the splines on the boss and/or the steering column.

Further, it will be appreciated that the splines 14/15 are but one of a number of possible complementary non-circular formations on the boss 12 and steering column 11 which could be used to secure the latter for co-rotation when the lock tongue 23 engages in the in-use groove 18.

Also, it will be understood that in the embodiment described above the groove 18 could be replaced by a simple recess in the steering column of just sufficient dimensions to accommodate the lock tongue 23 when the splines 14/15 are properly engaged. This is because the steering column 11 does not rotate relative to the boss 12 in this position and therefore the lock does not need to be able to rotate relative to the steering column. However, the groove 17 does need to be present in this embodiment, because it is necessary to permit the boss 12 to rotate when the lock tongue 23 engages in the groove 17.

The above embodiment of the invention therefore provides a construction of anti-theft device for motor vehicles which is of a relatively simple construction and which is easy and safe to use.

I claim:

1. An anti-theft device for a motor vehicle, comprising:

a steering wheel having a boss by which the steering wheel is mounted onto a steering column of the vehicle, the boss being slidable axially of the column between a first position in which the steering wheel and steering column are secured for co-rotation and a second position in which the steering wheel is freely rotatable on the steering column;

a recess within one end of a bore in the boss which recess opens onto the steering column and which extends transversely with respect to the steering column, the recess having an entrance on a far side of the steering column; and a lock housed in the recess in the boss for securing the steering wheel in a selected one of the first or second axial positions, the lock being removable from the recess in the boss only when the boss is removed from the steering column and the lock also including an element for selectively engaging in either one of two axially separated recesses in the steering column to lock the steering wheel in either one of the first or second axial positions, at least the recess corresponding to the second axial position of the steering wheel being a circumferential groove which permits free rotation of the steering wheel while the lock element remains engaged in the groove.

2. An anti-theft device as claimed in claim 1, wherein the steering column and steering wheel boss have complementary non-circular formations which are engaged in the first axial position of the steering wheel to secure the two together for co-rotation and which are disengaged in the second axial position of the steering wheel to permit free rotation of the latter.

* * * * *